United States Patent
Kim et al.

(10) Patent No.: US 10,701,739 B2
(45) Date of Patent: Jun. 30, 2020

(54) CALL TRANSMITTING/RECEIVING METHOD IN WIRELESS COMMUNICATION SYSTEM AND DEVICE FOR SAME

(71) Applicant: LG ELECTRONICS INC., Seoul (KR)

(72) Inventors: Laeyoung Kim, Seoul (KR); Hyunsook Kim, Seoul (KR); Jinsook Ryu, Seoul (KR); Jaehyun Kim, Seoul (KR); Taehun Kim, Seoul (KR); Sungduck Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 162 days.

(21) Appl. No.: 15/764,744

(22) PCT Filed: Sep. 30, 2016

(86) PCT No.: PCT/KR2016/010984
§ 371 (c)(1),
(2) Date: Mar. 29, 2018

(87) PCT Pub. No.: WO2017/057954
PCT Pub. Date: Apr. 6, 2017

(65) Prior Publication Data
US 2018/0324875 A1     Nov. 8, 2018

Related U.S. Application Data

(60) Provisional application No. 62/234,681, filed on Sep. 30, 2015.

(51) Int. Cl.
*H04W 76/10*     (2018.01)
*H04W 76/30*     (2018.01)
(Continued)

(52) U.S. Cl.
CPC ......... *H04W 76/10* (2018.02); *H04L 65/1006* (2013.01); *H04L 65/1016* (2013.01);
(Continued)

(58) Field of Classification Search
CPC ............. H04L 65/1006; H04L 65/1016; H04L 65/1073; H04W 60/04; H04W 76/10;
(Continued)

(56) References Cited

U.S. PATENT DOCUMENTS

2015/0223031 A1   8/2015   Denman et al.
2016/0295622 A1*   10/2016   Huang ................. H04W 12/06
(Continued)

FOREIGN PATENT DOCUMENTS

| WO | 2013002493 A2 | 1/2013 |
|---|---|---|
| WO | 2013047976 A1 | 4/2013 |
| WO | 2013122374 A1 | 8/2013 |

OTHER PUBLICATIONS

3GPP TR 23.799 V0.4.0, '3GPP; TSG-SA; Study on architectural enhancements to support MCPTT services (Release 13)', 3rd Generation Partnership Project; Technical Specification Group Services and System Aspects; Study on Architectural enhancements to Support Mission Critical Push to Talk over LTE (MCPTT) services; Dec. 2, 2014, pp. 16-18.
(Continued)

*Primary Examiner* — Kashif Siddiqui
(74) *Attorney, Agent, or Firm* — Dentons US LLP (57) ABSTRACT

One embodiment of the present invention, with respect to a call receiving method of a UE in a wireless communication system, a call receiving method of a UE comprises the steps of: establishing a one-to-one connection with a relay UE; transmitting an SIP register message including information pertaining to an IMS registration cancellation of the relay UE to an SIP server; and receiving a call from the SIP server,
(Continued)

wherein when a connection between the UE and the relay UE is cancelled, the relay UE is IMS registered.

10 Claims, 7 Drawing Sheets

(51) Int. Cl.
*H04L 29/06* (2006.01)
*H04W 8/02* (2009.01)
*H04W 88/04* (2009.01)
*H04W 80/10* (2009.01)
*H04W 88/02* (2009.01)
*H04W 8/00* (2009.01)
*H04W 60/04* (2009.01)

(52) U.S. Cl.
CPC ........... *H04L 65/1073* (2013.01); *H04W 8/02* (2013.01); *H04W 76/30* (2018.02); *H04W 88/04* (2013.01); *H04W 8/005* (2013.01); *H04W 60/04* (2013.01); *H04W 80/10* (2013.01); *H04W 88/02* (2013.01)

(58) Field of Classification Search
CPC ..... H04W 76/30; H04W 80/10; H04W 88/02; H04W 88/04; H04W 8/005; H04W 8/02
See application file for complete search history.

(56) References Cited

U.S. PATENT DOCUMENTS

| | | | |
|---|---|---|---|
| 2017/0070919 A1* | 3/2017 | Verger | H04L 65/1083 |
| 2018/0270891 A1* | 9/2018 | Kim | H04W 76/19 |
| 2018/0295556 A1* | 10/2018 | Baek | H04W 8/20 |
| 2019/0037518 A1* | 1/2019 | Russell | H04W 76/11 |
| 2019/0110238 A1* | 4/2019 | Buckley | H04B 7/15592 |

OTHER PUBLICATIONS

International Search Report from PCT/KR2016/010984, dated Jan. 6, 2017.
Written Opinion of the ISA from PCT/KR2016/010984, dated Jan. 6, 2017.

* cited by examiner

(a) UE-1 and UE-2 Camp on Different eNodeBs (b) UE-1 and UE-2 Camp on Same

CALL TRANSMITTING/RECEIVING METHOD IN WIRELESS COMMUNICATION SYSTEM AND DEVICE FOR SAME

This application is a National Stage Application of International Application No. PCT/KR2016/010984, filed on Sep. 30, 2016, which claims the benefit of U.S. Provisional Application No. 62/234,681, filed on Sep. 30, 2015, all of which are hereby incorporated by reference in their entirety for all purposes as if fully set forth herein.

TECHNICAL FIELD

The present disclosure relates to a wireless communication system, and more particularly, to a method and apparatus for transmitting and receiving a call between directly connected devices.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE

Technical Problem

An aspect of the present disclosure is to provide a method for receiving a call, when a plurality of terminals of the same subscriber are directly connected to each other.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solution

In an aspect of the present disclosure, a method for receiving a call by a user equipment (UE) in a wireless communication system includes establishing a one-to-one connection with a relay UE, transmitting, to a session initiation protocol (SIP) server, an SIP register message including information related to IP multimedia subsystem (IMS) deregistration of the relay UE, and receiving a call from the SIP server. If the connection between the UE and the relay UE is released, the relay UE is IMS-registered.

In another aspect of the present disclosure, a UE for receiving a call in a wireless communication system includes a transceiver and a processor. The processor is configured to establish a one-to-one connection with a relay UE, transmit, to an SIP server, an SIP register message including information related to IMS deregistration of the relay UE, and receive a call from the SIP server. If the connection between the UE and the relay UE is released, the relay UE is IMS-registered.

The information related to the IMS deregistration may be a request for releasing an existing registration of the same subscriber.

The UE and the relay UE may belong to the same subscriber.

When the UE transmits the SIP register message to the SIP server, the UE may use an IP address acquired from the relay UE.

If the UE uses an old IP address in transmitting the SIP register message to the SIP server, the transmission may be considered to be IMS re-registration.

The SIP server may include a proxy-call and session control function (P-CSCF), a serving-CSCF (S-CSCF), and an interrogating-CSCF (I-CSCF).

Advantageous Effects

According to the present disclosure, a call for directly connected devices of the same subscriber may be processed, while signaling consumption is minimized.

Effects obtainable from the present disclosure are non-limited by the above mentioned effect. And, other unmentioned effects can be clearly understood from the following description by those having ordinary skill in the technical field to which the present disclosure pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR CARRYING OUT THE INVENTION

The embodiments below are combinations of components and features of the present disclosure in a prescribed form. Each component or feature may be considered as selective unless explicitly mentioned as otherwise. Each component or feature may be executed in a form that is not combined with other components and features. Further, some components and/or features may be combined to configure an embodiment of the present disclosure. The order of operations described in the embodiments of the present disclosure may be changed. Some components or features of an embodiment may be included in another embodiment or may be substituted with a corresponding component or feature of the present disclosure.

Specific terms used in the description below are provided to help an understanding of the present disclosure, and the use of such specific terms may be changed to another form within the scope of the technical concept of the present disclosure.

In some cases, in order to avoid obscurity of the concept of the present disclosure, a known structure and apparatus may be omitted, or a block diagram centering on core functions of each structure or apparatus may be used. Moreover, the same reference numerals are used for the same components throughout the present specification.

The embodiments of the present disclosure may be supported by standard documents disclosed with respect to at least one of IEEE (Institute of Electrical and Electronics Engineers) 802 group system, 3GPP system, 3GPP LTE & LTE-A system and 3GPP2 system. Namely, the steps or portions having not been described in order to clarify the technical concept of the present disclosure in the embodiments of the present disclosure may be supported by the above documents. Furthermore, all terms disclosed in the present document may be described according to the above standard documents.

The technology below may be used for various wireless communication systems. For clarity, the description below centers on 3GPP LTE and 3GPP LTE-A, by which the technical idea of the present disclosure is non-limited.

Terms used in the present document are defined as follows.

UMTS (Universal Mobile Telecommunications System): a GSM (Global System for Mobile Communication) based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW: a network node of an EPS network, which performs UE IP address allocation, packet screening and filtering, charging data collection, etc.

SGW (Serving Gateway): a network node of an EPS network, which performs mobility anchor, packet routing, idle-mode packet buffering, and triggering of an MME's UE paging.

NAS (Non-Access Stratum): an upper stratum of a control plane between a UE and an MME. This is a functional layer for transmitting and receiving a signaling and traffic message between a UE and a core network in an LTE/UMTS protocol stack, and supports mobility of a UE, and supports a session management procedure of establishing and maintaining IP connection between a UE and a PDN GW.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

ProSe UE-to-UE Relay: is a form of relay in which a ProSe-enabled Public Safety UE acts as a ProSe Communication relay between two or more ProSe-enabled Public Safety UEs.

Remote UE: This is a Prose-enabled public safety UE connected to EPC through Prose UE-to-Network Relay without service from E-UTRAN in a UE-to-Network Relay operation, that is, Prose-enabled public safety UE configured to receive PDN connection, whereas this is a Prose-enabled public safety UE that performs communication with other Prose-enabled public safety UE through a Prose UE-to-UE Relay in a UE-to-UE relay operation.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

SLP (SUPL Location Platform): entity that controls Location Service Management and Position Determination. The SLP includes SLC(SUPL Location Center) function and SPC (SUPL Positioning Center) function. Details of the SLP will be understood with reference to Open Mobile Alliance (OMA) standard document OMA AD SUPL: "Secure User Plane Location Architecture".

USD (User Service Description): application/service layer transmits USD, which includes TMGI (Temporary Mobile Group Identity) for each MBMS service, start and end time of session, frequencies, and MBMS service area identities (MBMS SAIs) information belonging to MBMS service area, to the UE. Details of the USD will be understood with reference to 3GPP TS 23.246.

ISR (Idle mode Signaling Reduction): When a UE frequently moves between E-UTRAN and UTRAN/GERAN, waste of network resources occurs due to a repeated position registration process. As a method for reducing such a waste, when the UE is in an idle mode, after position registration for MME and SGSN (hereinafter, these two nodes will be referred to as mobility management node) is performed through the E-UTRAN and the UTRAN/GERAN, a separate position registration is not performed in the case that movement between two RATs (Radio Access Technologies) which are already registered or cell reselection is performed. Therefore, if DL (downlink) data to the corresponding UE is arrived, paging is transmitted to the E-UTRAN and the UTRAN/GERAN at the same time to successfully discover the UE, whereby the DL data may be transferred to the discovered UE. [see 3GPP TS 23.401 and 3GPP TS 23.060]

EPC (Evolved Packet Core)

Figure 1:
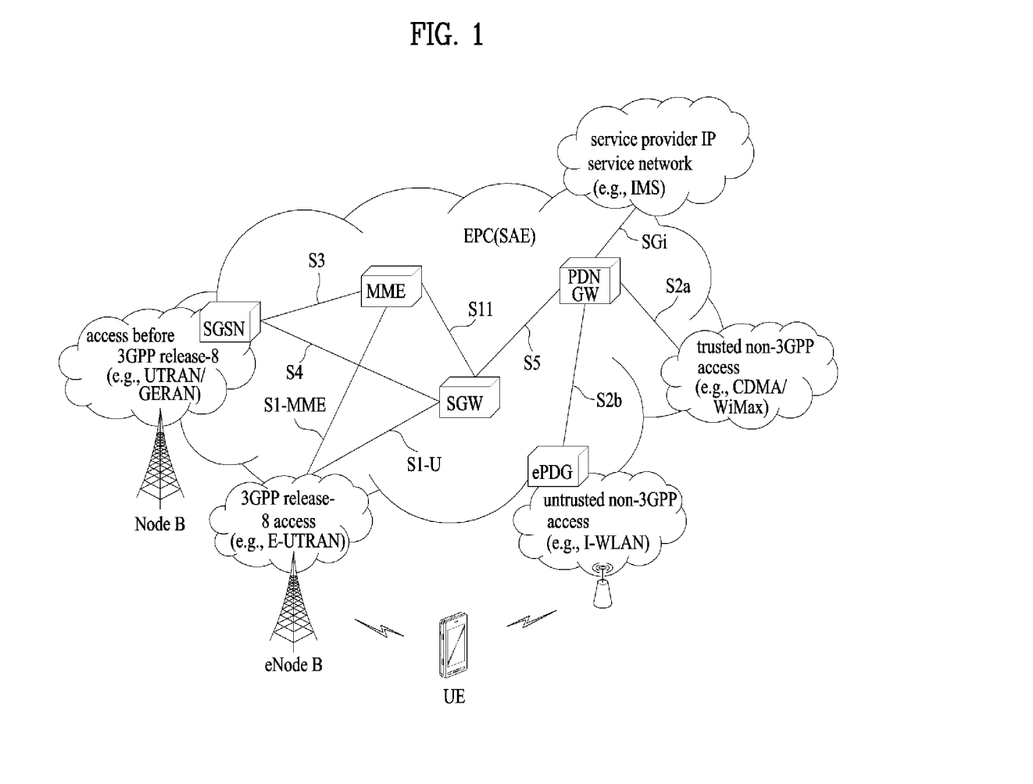
FIG. 1 is a schematic diagram for an EPS (Evolved Packet System) including an EPC (Evolved Packet Core)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, In 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
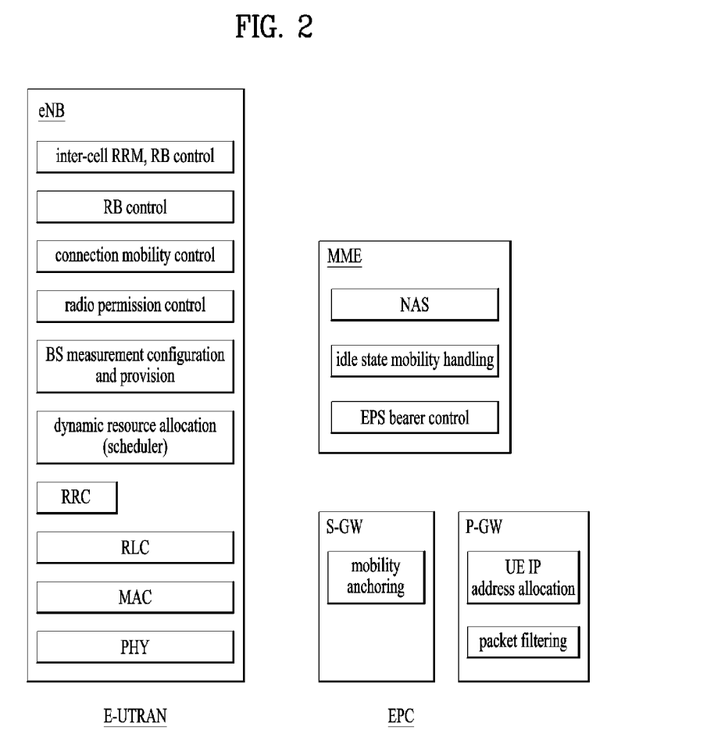
FIG. 2 is a diagram illustrating general architectures of E-UTRAN and EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
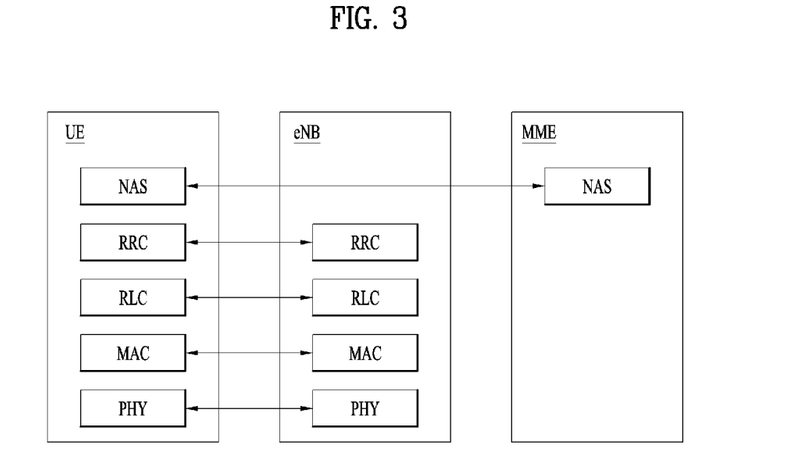
FIG. 3 is a diagram illustrating a structure of a radio interface protocol in a control plane.
Figure 4:
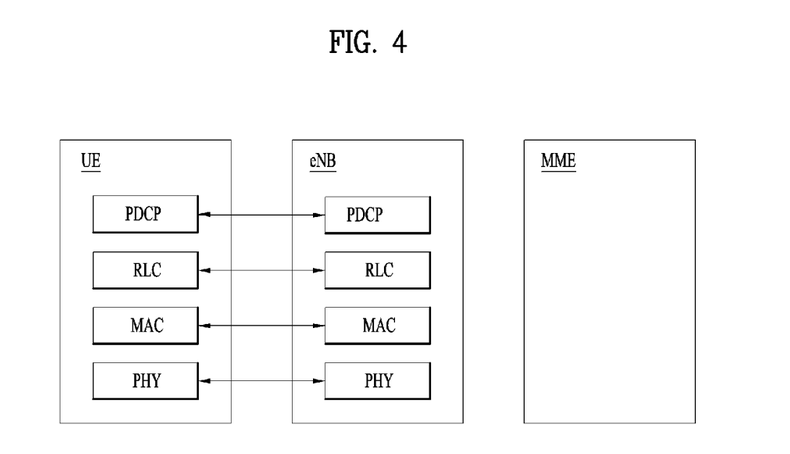
FIG. 4 is a diagram illustrating a structure of a radio interface protocol in a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of symbols in the time domain and a plurality of subcarriers. One subframe consists of a plurality of resource blocks. One resource block consists of a plurality of symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers.

First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The eSM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
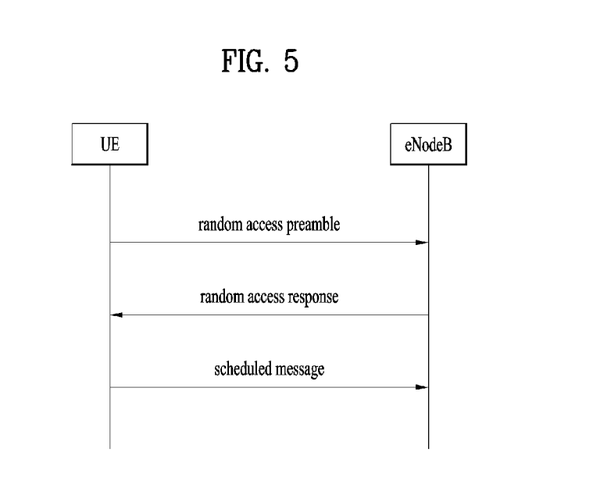
FIG. 5 is a flowchart for explaining a random access procedure.

FIG. 5 is a flowchart illustrating a random access procedure in 3GPP LTE.

The random access procedure is used for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
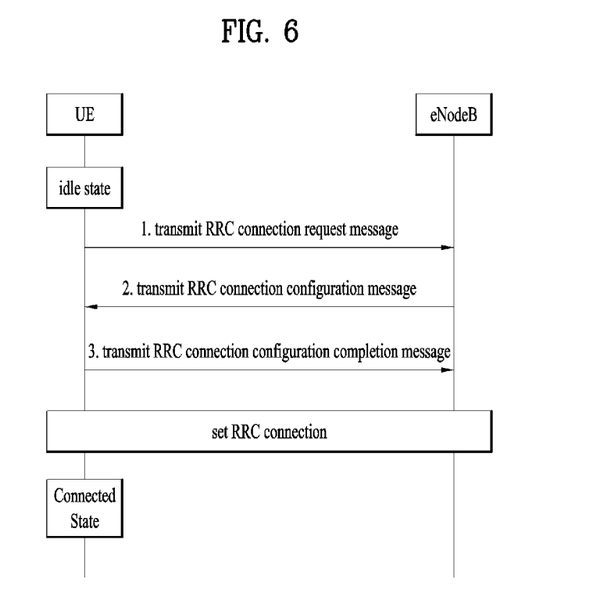
FIG. 6 is a flowchart illustrating a connection procedure in an RRC (radio resource control) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNode B and transition to the RRC connected mode.

ProSe (Proximity Service)

ProSe service is a service which enables discovery and direct communication, communication via an eNodeB, or communication via a third device between physically close devices.

Figure 7:
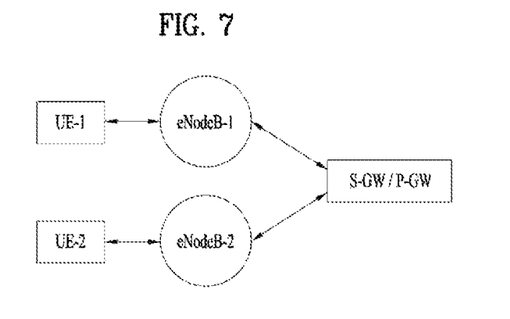
FIG. 7 illustrates a data path through an EPS.

FIG. 7 illustrates a default data path in which two UEs communicate in an EPS. The default path passes through an eNodeB and a core network (i.e., EPC) which are managed by a business provider. In the present disclosure, this path is referred to as an infrastructure data path (or EPC path). Further, communication through this infrastructure data path is referred to as infrastructure communication.

Figure 8:
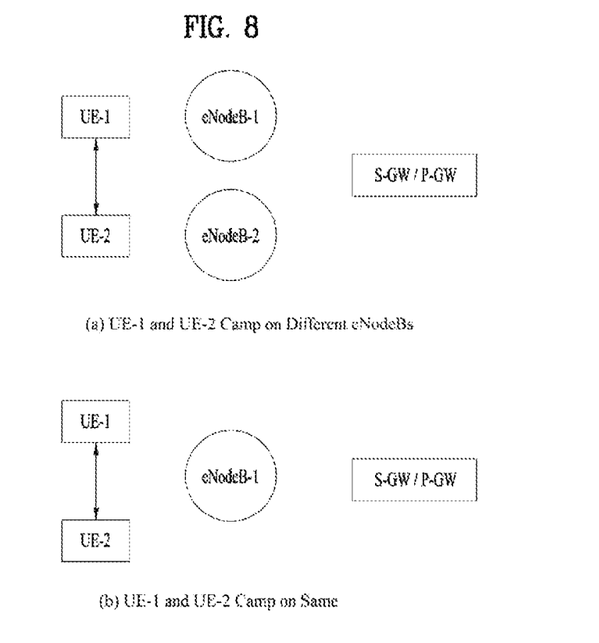
FIGS. 8 and 9 illustrate data paths in a direct mode.

FIG. 8 illustrates a direct-mode data path between two ProSe-enabled UEs. This direct-mode data path does not pass through an eNodeB and a core network (i.e., EPC) which are managed by a business provider. FIG. 8(a) illustrates data exchange in a direct-mode communication path between UE-1 and UE-2 which have camped on different eNodeBs, and FIG. 8(b) illustrates data exchange in a direct-mode communication path between UE-1 and UE-2 which have camped on the same eNodeB.

Figure 9:
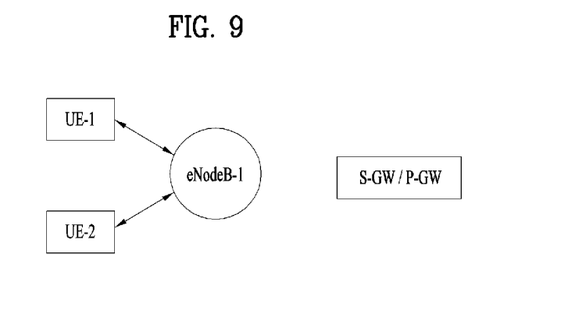

FIG. 9 illustrates a communication path (a locally-routed data path) passing through an eNodeB between two ProSe-enabled UEs. The communication path passing through the eNodeB does not pass through a core network (i.e., EPC) managed by a business operator.

Along with the recent emergence of various types of wearable devices (smart watches, and the like) and Internet of things (IoT) devices, various scenarios using such terminals have been produced. For example, there is a scenario in which a wearable device receives a service from a network through a smart phone (i.e., using the smart phone as a relay), rather than the wearable device receives the service in a stand-alone manner or by directly connecting to a mobile communication network. This is because a wearable device or an IoT device is characterized by lower power capacity, lower RF capability, and lower cost, compared to a general terminal such as a smart phone.

Such a terminal having a limited capacity and/or functionality relative to a general UE may be referred to as a lightweight UE. In the following description of the present disclosure, it is assumed that this lightweight UE does not perform a direct radio (or AS: Access Stratum) operation to a network. For example, in the case of an E-UTRAN, it may be assumed that a lightweight UE does not perform a Uu-related operation (which should not be construed as limiting the present disclosure, and the present disclosure is also applicable to a case in which a lightweight UE performs a direct radio (or AS: Access Stratum) operation to a network). The lightweight UE may perform a D2D operation (direct discovery or direct communication) with another UE. Herein, the lightweight UE may use non-3GPP radio such as WiFi or Bluetooth as well as 3GPP radio such as E-UTRA. A UE that provides a network connection service to the lightweight UE may be referred to as a relay UE. If the lightweight UE receives the network connection service through the relay UE, the lightweight UE may be referred to as a remote UE.

Now, a detailed description will be given below of a mechanism of efficiently providing a service by using a plurality of UEs (lightweight UE(s) and a relay UE) belonging to the same subscriber or the same group in a mobile communication system such as a 3GPP EPS (Evolved Packet System). In the following description, a call may be a call, traffic, a service, a flow, data, or MMTel.

Embodiment

Figure 10:
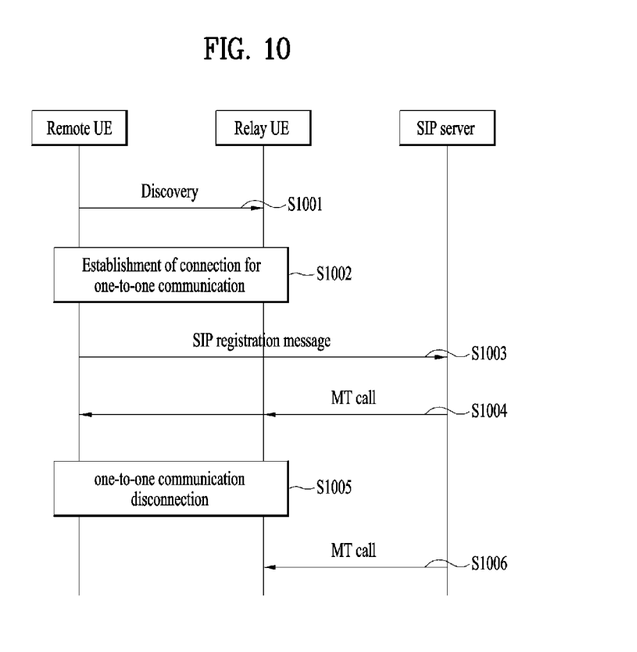
FIG. 10 is a view illustrating an embodiment of the present disclosure.

A lightweight UE may detect a relay UE which will provide a network connection service, and attach to the detected relay UE. Herein, attach may be interpreted as associate, layer 2 link establishment, one-to-one connection establishment, and so on. Thus, the lightweight UE becomes a remote UE. For example, as illustrated in FIG. 10, a lightweight UE (remote UE) may establish a one-to-one connection with a relay UE in a discovery procedure (S1001). The relay UE and the remote UE may exchange various pieces of information (ID-related information, device information, and so on) with each other.

Once the remote UE acquires an IP address from the relay UE, the remote UE may perform IMS registration. If the remote UE uses an old IP address (the old IP address may be an IP address acquired when the remote UE has been connected directly to a network, or an IP address acquired from a previously connected relay UE), instead of acquiring an IP address, the remote UE may perform IP multimedia subsystem (IMS) registration by using the old IP address (this may be considered to be re-registration). Then, the relay UE performs IMS deregistration. That is, the remote UE and the relay UE may perform registration and deregistration, respectively.

Or if the remote UE performs IMS registration, the relay UE may be IMS-deregistered. Therefore, the relay UE does not need to perform IMS deregistration. For this purpose, a registration message that the remote UE transmits to an IMS network may include information that enables IMS deregistration of the relay UE. For example, as illustrated in FIG. 10, an SIP REGISTER message including information related to IMS deregistration of the relay UE may be transmitted to a session initiation protocol (SIP) server (proxy-call session control function (P-CSCF)). The information related to the IMS deregistration may be a deregistration request for the existing registration of the same subscriber. Or the information related to the IMS deregistration may be any of various types of information including information requesting deregistration for the existing registration of the same group, information indicating a registration other than a multiple registration, and information requesting replacement of the existing registration, or a combination thereof. Further, this information may be explicitly or implicitly included in an IMS REGISTER message.

The remote UE and the relay UE may belong to the same subscriber. The same subscriber may imply that subscribers subscribed to an IMS service are the same, subscribers subscribed to a packet service are the same, subscribers subscribed to both the IMS and packet services are the same, or subscribers have the same ID (international mobile subscriber identity (IMSI), IP multimedia public identity (IMPU), mobile subscriber ISDN number (MSISDN), IP multimedia private identity (IMPI), group ID, or the like) or the same ID combination. Thus, if a plurality of devices (e.g., a smart phone and a smart watch) belong to the same subscriber, signaling repetition and resource waste caused by establishing and maintaining an IMS connection by each device may be prevented.

Unlike a scheme in which the remote UE actively requests IMS deregistration of the relay UE, if an IMS network receives an IMS registration message from a UE belonging to the same subscriber or the same group in an IMS network, the IMS network may deregister an existing registered UE from the IMS.

Meanwhile, rather than the relay UE performs deregistration to the IMS network, the remote UE may include information indicating that the registration of the remote UE has priority over (or precedes) the registration of any other UE belonging to the same subscriber or the same group, during IMS registration. In this case, when a call directed to the same subscriber or the same group is received in the IMS network, the high-priority UE may be a destination of the call.

In another example, rather than the remote UE performs registration to the IMS network, the relay UE may register the remote UE during IMS deregistration of the relay UE. For this purpose, information requesting IMS registration of the remote UE may be included in a deregistration message (e.g., SIP REGISTER with its expiration value of zero seconds) that the relay UE transmits to the IMS network. Similarly in this example, if the network or the IMS network receives an IMS deregistration message, and information about a specific UE belonging to the same subscriber or the same group is included in the IMS deregistration message or subscriber information, IMS registration of the specific UE may be determined (e.g., IMS deregistration).

If the IMS network receives an MT call (Mobile Terminated call) for the subscriber or the group, the IMS network transmits the call only to the remote UE as a destination. This is because the remote UE is solely registered or has priority for the subscriber or the group due to the above-described IMS registration/deregistration. The MT call is provided to the remote UE via the relay UE (S1004 in FIG. 10).

If the remote UE is detached from the relay UE (by an explicit request from the remote UE or the relay UE) (due to a weak signal strength or implicit by no keep-alive), the relay UE registers to the IMS network. Detach may be interpreted as de-associate, layer 2 link release, one-to-one connection disconnection, and so on.

Or if a D2D signal state between the remote UE and the relay UE becomes poor before detachment of the remote UE, the relay UE may register to the IMS network. Further, information for IMS deregistration of the remote UE may be included, and the relay UE may perform the IMS registration of the relay UE and the IMS deregistration of the remote UE separately. If the D2D signal state between the remote UE and the relay UE becomes poor, the remote UE may deregister from the IMS network. Further, information requesting registration of the relay UE may be included, and the remote UE may perform the IMS deregistration of the remote UE and the IMS registration of the relay UE separately. Instead of deregistration of the remote UE, it may be indicated to the IMS network that the registration of the remote UE does not have priority over (or does not precede) the registration of any other UE belonging to the same subscriber or the same group. When the relay UE is registered, or for the old registration of the relay UE, it may be indicated to the IMS network that the registration of the relay UE has priority over (or precedes) the registration of any other UE belonging to the same subscriber or the same group.

If the IMS network receives an MT call directed to the subscriber or the group, the IMS network transmits the call only to the relay UE as a destination. As descried before, this is because the relay UE is an address solely registered or a preceding address, for the subscriber or the group due to the IMS registration/deregistration.

In the case where a plurality of remote UEs receive the network connection service through one relay UE, and the UEs belong to the same subscriber or the same group, the present disclosure may also be extended to a determination made by the IMS network as to which remote UE should be selected as a destination for an MT call based on a medium type, a service type, an application type, the characteristics of an IP flow, and so on.

Figure 11:
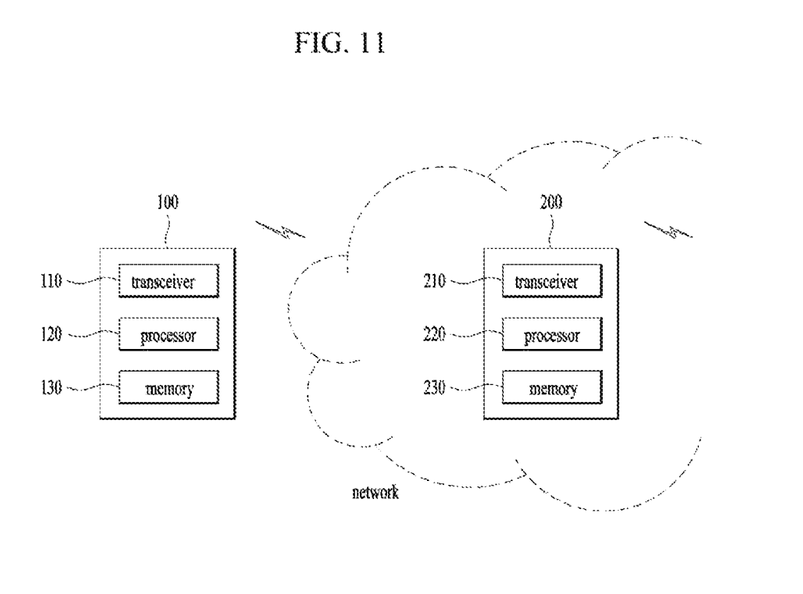
FIG. 11 is a block diagram of node apparatuses according to an embodiment of the present disclosure.

FIG. 11 illustrates configurations of a UE and a network node according to an embodiment of the present disclosure.

Referring to FIG. 11, a UE 100 according to the present disclosure may include a transceiver 110, a processor 120 and a memory 130. The transceiver 110 can be configured to transmit signals, data and information to an external device and receive signals, data and information from the external device. The UE 100 can be connected to the external device in a wired or wireless manner. The processor 120 can control overall operation of the UE 100 and can be configured to process information transmitted/received between the UE 100 and the external device. In addition, the processor 120 can be configured to perform UE operation proposed by the present disclosure. The memory 130 can store processed information for a predetermined time and can be replaced with a configuration element such as a buffer (not shown).

Referring to FIG. 11, a network node 200 according to the present disclosure may include a transceiver 210, a processor 220 and a memory 230. The transceiver 210 can be configured to transmit signals, data and information to an external device and to receive signals, data and information from the external device. The network node 200 can be connected to the external device in a wired or wireless manner. The processor 220 can control overall operation of the network node 200 and can be configured to process information transmitted/received between the network node 200 and the external device. In addition, the processor 220 can be configured to perform network node operation proposed by the present disclosure. The memory 230 can store processed information for a predetermined time and can be replaced with a configuration element such as a buffer (not shown).

The aforementioned UE 100 and network node 200 may be implemented such that the above-described various embodiments of the present disclosure are independently applied or two or more thereof are simultaneously applied, and description of redundant parts is omitted for clarity.

The embodiments of the present disclosure can be achieved by various means, for example, hardware, firmware, software, or a combination thereof.

In a hardware configuration, the embodiments of the present disclosure can be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the aforementioned various embodiments of the present disclosure are described with reference to examples applied to 3GPP LTE system, it can be applied to various kinds of wireless communication systems as well as the 3GPP LTE system.

The invention claimed is:

1. A method for receiving a call by a user equipment (UE) in a wireless communication system, the method comprising:
    establishing a one-to-one connection with a relay UE;
    transmitting, to a session initiation protocol (SIP) server, an SIP register message including information related to IP multimedia subsystem (IMS) deregistration of the relay UE; and
    receiving a call from the SIP server,
    wherein when the connection between the UE and the relay UE is released, the relay UE is IMS-registered,
    wherein based on the UE using an IP address that is different from a current IP address in transmitting the SIP register message to the SIP server, the transmission is an IMS re-registration message.

2. The method according to claim 1, wherein the information related to the IMS deregistration is a request for releasing an existing registration of a same subscriber.

3. The method according to claim 2, wherein the UE and the relay UE belong to the same subscriber.

4. The method according to claim 1, wherein when the UE transmits the SIP register message to the SIP server, the UE uses an IP address acquired from the relay UE.

5. The method according to claim 1, wherein the SIP server includes a proxy-call and session control function (P-CSCF), a serving-CSCF (S-CSCF), and an interrogating-CSCF (I-CSCF).

6. A user equipment (UE) for receiving a call in a wireless communication system, the UE comprising:
    a transceiver; and
    a processor,
    wherein the processor is configured to establish a one-to-one connection with a relay UE, transmit, to a session initiation protocol (SIP) server, an SIP register message including information related to IP multimedia subsystem (IMS) deregistration of the relay UE, and receive a call from the SIP server, and
    wherein when the connection between the UE and the relay UE is released, the relay UE is IMS-registered,
    wherein based on the UE using an IP address that is different from a current IP address in transmitting the SIP register message to the SIP server, the transmission is an IMS re-registration message.

7. The UE according to claim 6, wherein the information related to the IMS deregistration is a request for releasing an existing registration of a same subscriber.

8. The UE according to claim 7, wherein the UE and the relay UE belong to the same subscriber.

9. The UE according to claim 6, wherein when the UE transmits the SIP register message to the SIP server, the UE uses an IP address acquired from the relay UE.

10. The UE according to claim 6, wherein the SIP server includes a proxy-call and session control function (P-CSCF), a serving-CSCF (S-CSCF), and an interrogating-CSCF (I-CSCF).

\* \* \* \* \*